United States Patent
Omori (10) Patent No.: US 7,492,834 B2
(45) Date of Patent: Feb. 17, 2009

(54) REGENERATING APPARATUS, REGENERATING METHOD, AND RECEIVER

(75) Inventor: Kumi Omori, Tokyo (JP)

(73) Assignee: NEC Corporation, Tokyo (JP)

( * ) Notice: Subject to any disclaimer, the term of this patent is extended or adjusted under 35 U.S.C. 154(b) by 616 days.

(21) Appl. No.: 11/254,665

(22) Filed: Oct. 21, 2005

(65) Prior Publication Data

US 2006/0088130 A1    Apr. 27, 2006

(30) Foreign Application Priority Data

Oct. 21, 2004    (JP)    ............... 2004-306591

(51) Int. Cl.
*H04L 25/06*    (2006.01)
*H04L 17/02*    (2006.01)

(52) U.S. Cl. ..................... 375/317; 341/176

(58) Field of Classification Search .......... 375/317, 375/316, 318; 341/176; 398/202, 208, 212
See application file for complete search history.

(56) References Cited

U.S. PATENT DOCUMENTS 6,118,828 A * 9/2000 Schleifer ............... 375/317

FOREIGN PATENT DOCUMENTS

JP    2002-77111 A    3/2002

* cited by examiner

*Primary Examiner*—Khai Tran
(74) *Attorney, Agent, or Firm*—Sughrue Mion, PLLC (57) ABSTRACT

A regenerating apparatus includes an identification circuit, an error correcting circuit, an abnormality detecting circuit which generates an alarm when a predetermined abnormal operation is detected, a threshold value adjusting circuit which adjusts the threshold value to make a first error correction number equal to a second error correction number when the alarm is not generated, and a threshold value initializing circuit which sets the threshold value to an initial threshold value when the alarm is generated.

18 Claims, 5 Drawing Sheets

REGENERATING APPARATUS, REGENERATING METHOD, AND RECEIVER

BACKGROUND OF THE INVENTION

1. Field of the Invention

The present invention relates to a regenerating apparatus for regenerating a digital signal from an input signal, a regenerating method for the regenerating apparatus, and to a receiver including the regenerating apparatus.

2. Description of the Related Art

In the communication field, it is important to increase information transmission capacity. To increase the capacity, a wavelength division multiplexing (WDM) transmission system for transmitting a plurality of signals whose wavelengths are different from one another using a single optical fiber cable is well known. A receiving apparatus using the WDM transmission system includes an identification circuit for comparing an input signal with a predetermined threshold value and converting the input signal to a digital signal based on a result obtained by comparison.

The WDM transmission system is affected by a transmission line loss as in the case with other normal transmission systems. The transmission line loss may be, for example, a loss caused by wavelength dispersion, an SN deterioration, a nonlinear effect, a power fluctuation, or the like. Therefore, deterioration such as distortion, of a waveform of a signal that reaches the receiving apparatus through a transmission line occurs.

When the input signal deteriorates, the identification circuit erroneously identifies the input signal and converts it to an erroneous digital signal. To prevent this, the receiving apparatus includes a forward error correction (hereinafter also referred to as a "FEC") circuit for correcting an error of the digital signal, which is provided in a subsequent stage of the identification circuit.

Up to now, a threshold value of the identification circuit is constantly fixed. However, when the input signal deteriorates significantly in such a system in which the threshold value is fixed, the erroneous identification of the identification circuit exceeds an error correction capacity of the FEC circuit because of the fixation of the threshold value. Therefore, although the FEC circuit is mounted on the receiving apparatus, a data error caused by the transmission line loss or the like cannot be sufficiently prevented.

In order to solve such a problem, JP 2002-077111 A discloses a regenerating apparatus for changing the threshold value of the identification circuit. In the regenerating apparatus, the threshold value of the identification circuit is not constantly fixed, but is adjusted based on error correction information outputted from the FEC circuit.

Hereinafter, the regenerating apparatus will be described in detail.

Figure 5:
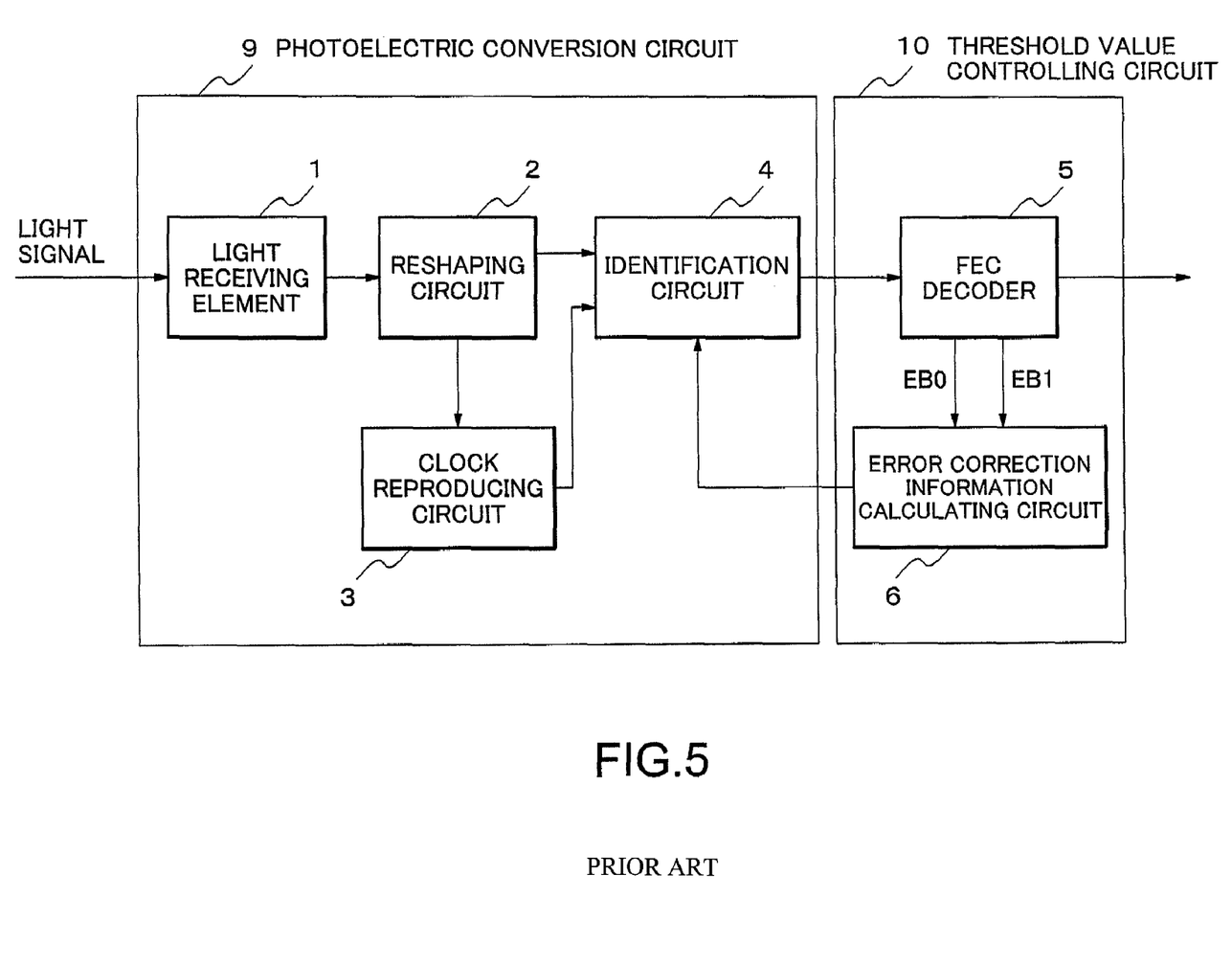
FIG. 5 is a block diagram showing a structure of a conventional regenerating apparatus.

FIG. 5 is a block diagram showing a structure of the regenerating apparatus disclosed in JP 2002-077111 A. The regenerating apparatus includes a photoelectric conversion circuit 9 and a threshold value controlling circuit 10.

The photoelectric conversion circuit 9 includes a light receiving element 1, a reshaping circuit 2, a clock reproducing circuit 3, and an identification circuit 4. The light receiving element 1 receives a light signal from a transmission line such as an optical fiber and converts the light signal to an electrical signal. The reshaping circuit 2 amplifies an output signal from the light receiving element 1 up to a predetermined level. The clock reproducing circuit 3 extracts a clock signal from an output signal of the reshaping circuit 2. The identification circuit 4 converts the output signal from the reshaping circuit 2 to a digital signal of "0" or "1" based on a threshold value and performs retiming based on the clock signal outputted from the clock reproducing circuit 3.

The threshold value controlling circuit 10 includes an FEC decoder 5 and an error correction information calculating circuit 6. The FEC decoder 5 performs FEC decoding for error correction on the digital signal outputted from the photoelectric conversion circuit 9. The FEC decoder 5 generates error correction information EB0 indicating the number of bits subjected to error correction from "1" to "0" and error correction information EB1 indicating the number of bits subjected to error correction from "0" to "1". In this case, the error correction information EB0 and EB1 are changed according to an error correction state, that is, an input signal deterioration state. The error correction information calculating circuit 6 calculates a threshold value based on the error correction information EB0 and EB1 outputted from the FEC decoder 5 and outputs the threshold value to the identification circuit 4 included in the photoelectric conversion circuit 9. The identification circuit 4 converts the output signal from the reshaping circuit 2 to the digital signal of "0" or "1" based on the threshold value.

In other words, the above-mentioned regenerating apparatus changes the threshold value according to the error correction information EB0 and EB1 which are successively varied. Therefore, the occurrence of data error can be suppressed unlike the conventional system in which the threshold value is fixed.

However, the regenerating apparatus continuously changes the threshold value based on the error correction information EB0 and EB1. That is, even when an apparatus abnormality occurs, the regenerating apparatus continues to change the threshold value based on the error correction information EB0 and EB1. In the case of the occurrence of any apparatus abnormality, it is more likely that the respective circuits malfunction. For example, when the FEC decoder 5 or the error correction information calculating circuit 6 malfunction, the threshold value is likely to be calculated as an erroneous value. In some cases, the threshold value becomes an extremely large value (value close to 1) or an extremely small value (value close to 0). Therefore, when the identification circuit 4 converts a received signal to a digital signal based on the erroneously calculated threshold value, an enormous number of data errors may be generated. In other words, when the regenerating apparatus disclosed in JP 2002-077111 A normally operates, it provides sufficient performance. On the other hand, when the apparatus abnormality occurs, it is likely that the performance of the regenerating apparatus becomes lower than that of the conventional system in which the threshold value is fixed. Thus, the regenerating apparatus disclosed in JP 2002-077111 A has a defect that the performance is unstable.

SUMMARY OF THE INVENTION

The present invention has been made to solve the above-mentioned problems.

An exemplary feature of the present invention is to provide a regenerating apparatus, a regenerating method for the regenerating apparatus, and a receiver including the regenerating apparatus, which capable of obtaining a high-quality digital signal during a normal apparatus operation and stably obtaining a digital signal having predetermined quality without extreme deterioration in quality even when an apparatus abnormality occurs.

In a first aspect of the present invention, a regenerating apparatus includes an identification circuit which regenerates a digital signal from an input signal by determining whether or not a level of the input signal exceeds a threshold value, an error correcting circuit which corrects an error of the regenerated digital signal, an abnormality detecting circuit which monitors an operation state of the regenerating apparatus and generates an alarm when a predetermined abnormal operation is detected, a threshold value adjusting circuit which adjusts the threshold value to make a first error correction number indicating the number of error bits corrected from 0 to 1 equal to a second error correction number indicating the number of error bits corrected from 1 to 0 when the alarm is not generated, and a threshold value initializing circuit which sets the threshold value to an initial threshold value when the alarm is generated.

In a second aspect of the present invention, a regenerating method for an apparatus that executes an operation for regenerating a digital signal from an input signal by determining whether or not a level of the input signal exceeds a threshold value and correcting an error of the regenerated digital signal includes adjusting the threshold value to make a first error correction number indicating the number of error bits corrected from 0 to 1 equal to a second error correction number indicating the number of error bits corrected from 1 to 0 while the apparatus normally operates and setting the threshold value to an initial threshold value when the apparatus has an abnormality.

In a third aspect of the present invention, a receiver includes an identification circuit which regenerates a digital signal from an input signal by determining whether or not a level of the input signal exceeds a threshold value, an error correcting circuit which corrects an error of the regenerated digital signal, an abnormality detecting circuit which monitors an operation state of the receiver and generates an alarm when a predetermined abnormal operation is detected, a threshold value adjusting circuit which adjusts the threshold value to make a first error correction number indicating the number of error bits corrected from 0 to 1 equal to a second error correction number indicating the number of error bits corrected from 1 to 0 when the alarm is not generated, and a threshold value initializing circuit for setting the threshold value to an initial threshold value when the alarm is generated.

According to the present invention, during the normal apparatus operation, a threshold value is adjusted so that the number of first error corrections and the number of second error corrections are equal to each other. Therefore, it is possible to obtain a high-quality digital signal having less erroneous data. Further, according to the present invention, when an apparatus abnormality occurs, the threshold value is set to an initial threshold value. Therefore, a digital signal having predetermined quality can be stably obtained without extreme deterioration in quality.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE EXEMPLARY EMBODIMENTS

Figure 1:
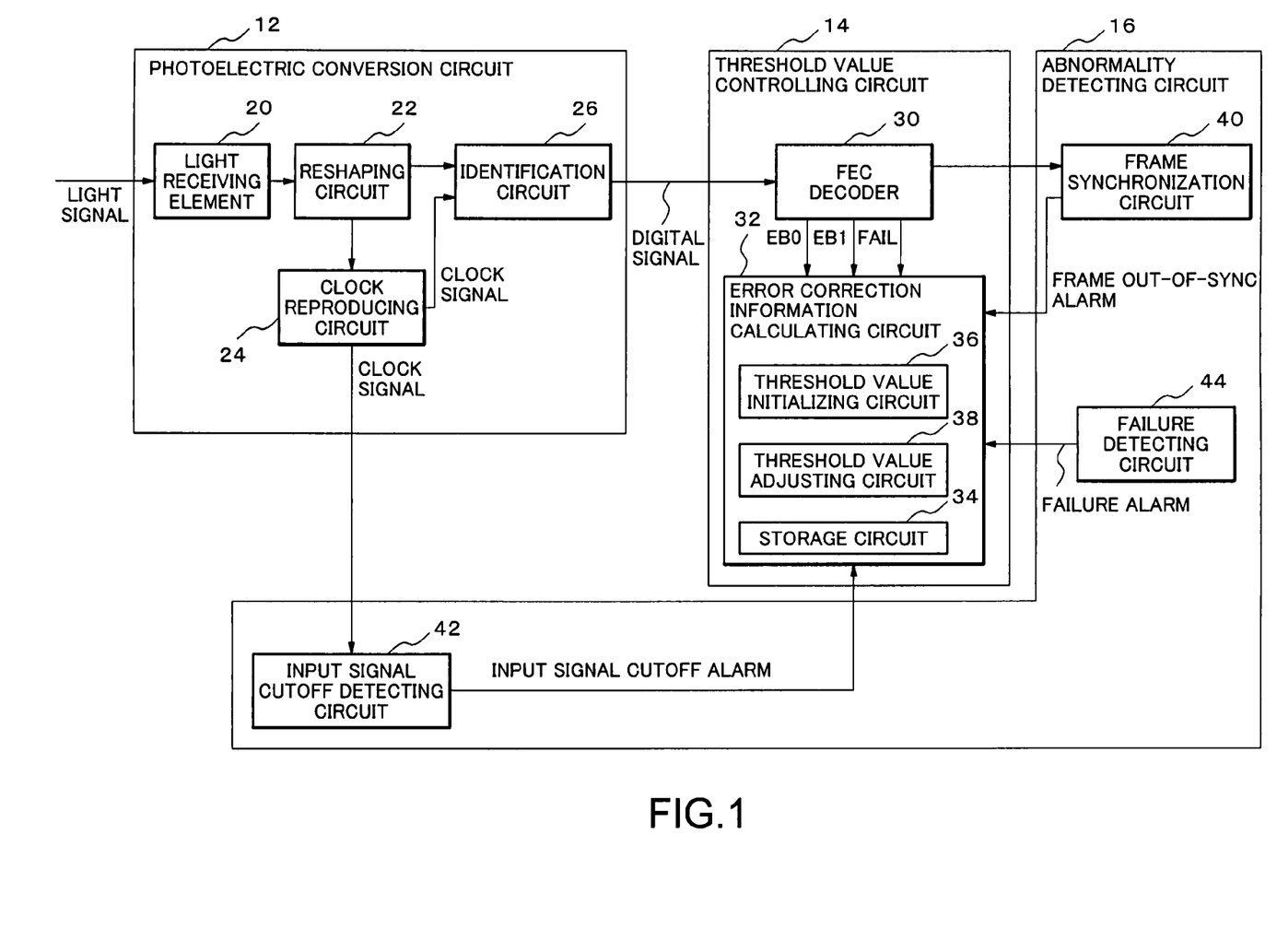
FIG. 1 is a block diagram showing a structure of a regenerating apparatus according to an embodiment of the present invention.

Hereinafter, an embodiment of the present invention will be described in detail with reference to the accompany drawings. FIG. 1 is a block diagram showing a structure of a regenerating apparatus 10 according to the exemplary embodiment of the present invention. The regenerating apparatus 10 is normally incorporated in a receiver for digital communication, for example, a receiver for WDM communication in the optical communication field. The regenerating apparatus 10 is an apparatus for regenerating a digital signal from a signal received from a transmitter through a predetermined communication medium. Hereinafter, an example in which the regenerating apparatus 10 is incorporated in a receiver for optical communication will be described.

The regenerating apparatus 10 mainly includes a photoelectric conversion circuit 12, a threshold value controlling circuit 14, and an abnormality detecting circuit 16.

The photoelectric conversion circuit 12 is fundamentally a circuit for converting a light signal received from a transmission line such as an optical fiber to an electrical signal and further converting the converted electrical signal to a digital signal. The photoelectric conversion circuit 12 includes a light receiving element 20, a reshaping circuit 22, a clock reproducing circuit 24, and an identification circuit 26. The light receiving element 20 receives the light signal through a transmission line such as the optical fiber and converts the received light signal to the electrical signal. The reshaping circuit 22 amplifies an output signal from the light receiving element 20 up to a predetermined level. The clock reproducing circuit 24 extracts a clock signal from an output signal from the reshaping circuit 22. The identification circuit 26 converts the output signal from the reshaping circuit 22 to a digital signal of "0" or "1" based on a threshold value and performs retiming based on the clock signal outputted from the clock reproducing circuit 24.

The threshold value controlling circuit 14 includes an FEC decoder 30 and an error correction information calculating circuit 32.

The FEC decoder 30 performs FEC decoding for error correction on the digital signal outputted from the identification circuit 26. The FEC decoder 30 outputs three kinds of error correction information EB0, EB1, and FAIL to the error correction information calculating circuit 32. The error correction information EB0 is information indicating the number of bits per predetermined time, which are subjected to error correction from "1" to "0". The error correction information EB1 indicating the number of bits per predetermined time, which are subjected to error correction from "0" to "1". The error correction information FAIL is information indicating the number of bits per predetermined time, which cannot be subjected to error correction.

The error correction information calculating circuit 32 fundamentally determines a threshold value based on the error correction information EB0, EB1, and FAIL outputted from the FEC decoder 30 and alarm information outputted from the abnormality detecting circuit 16 and outputs the threshold value to the identification circuit 26.

The error correction information calculating circuit 32 mainly includes a storage circuit 34, a threshold value initializing circuit 36, and a threshold value adjusting circuit 38.

The storage circuit 34 stores an initial threshold value in advance. The initial threshold value is a reference threshold value set when the regenerating apparatus 10 is activated. A threshold value for converting the output signal from the reshaping circuit 22 to a suitable digital signal is normally set as the initial threshold value. For example, an intermediate value of a maximum amplitude of the output signal from the reshaping circuit 22. The set values are merely examples and thus the initial threshold value can be set to an arbitrary value.

When the alarm information is outputted from the abnormality detecting circuit 16, the threshold value initializing circuit 36 sets the above-mentioned initial threshold value as the threshold value for the identification circuit 26.

When the alarm is not generated, the threshold value adjusting circuit 38 adjusts (calculates) the threshold value based on the error correction information EB0, EB1, and FAIL from the FEC decoder 30 and outputs the adjusted threshold value to the identification circuit 26.

The abnormality detecting circuit 16 detects various abnormalities of the regenerating apparatus 10 and outputs alarm information related to each of the abnormalities to the error correction information calculating circuit 32. The abnormality detecting circuit 16 includes a frame synchronization circuit 40, an input signal cutoff detecting circuit 42, and a failure detecting circuit 44. The frame synchronization circuit 40 achieves frame synchronization. When the frame synchronization is lost, the frame synchronization circuit 40 outputs frame out-of-synchronization alarm information to the error correction information calculating circuit 32. The input signal cutoff detecting circuit 42 determines whether or not the input signal is cut off. When the input signal is cut off, the input signal cutoff detecting circuit 42 outputs input signal cutoff alarm information to the error correction information calculating circuit 32. The failure detecting circuit 44 detects a failure of the entire receiver including the regenerating apparatus 10 shown in FIG. 1. When the failure is detected, the failure detecting circuit 44 outputs failure alarm information to the error correction information calculating circuit 32.

The regenerating apparatus 10 according to this embodiment has the above-mentioned structure. Next, the operation of the regenerating apparatus 10 will be described. As shown in FIG. 1, the light receiving element 20 included in the photoelectric conversion circuit 12 receives the light signal and converts the received light signal to the electrical signal. The reshaping circuit 22 amplifies the electrical signal obtained by the light receiving element 20 up to a predetermined level.

The clock reproducing circuit 24 extracts the clock signal from the output signal from the reshaping circuit 22. The clock reproducing circuit 24 detects a phase difference between a clock signal from an internal oscillator included therein and an input signal (output signal from the reshaping circuit 22). The clock reproducing circuit 24 performs phase locked loop (PLL) control so that a frequency and a phase of the clock signal from the internal oscillator are equal to a frequency and a phase of the input signal.

The identification circuit 26 converts the output signal from the reshaping circuit 22 to a digital signal of "0" or "1" based on the threshold value and performs the retiming of the digital signal based on the clock signal outputted from the clock reproducing circuit 24. The digital signal obtained by the identification circuit 26 is outputted to the FEC decoder 30 of the threshold value controlling circuit 14.

The FEC decoder 30 performs the error correction on the output signal (digital signal) from the identification circuit 26 by the FEC decoding and outputs the error correction information EB0, EB1, or FAIL corresponding to a result obtained by the error correction to the error correction information calculating circuit 32. The error correction information EB0, EB1, and FAIL are as described above.

Figure 2:
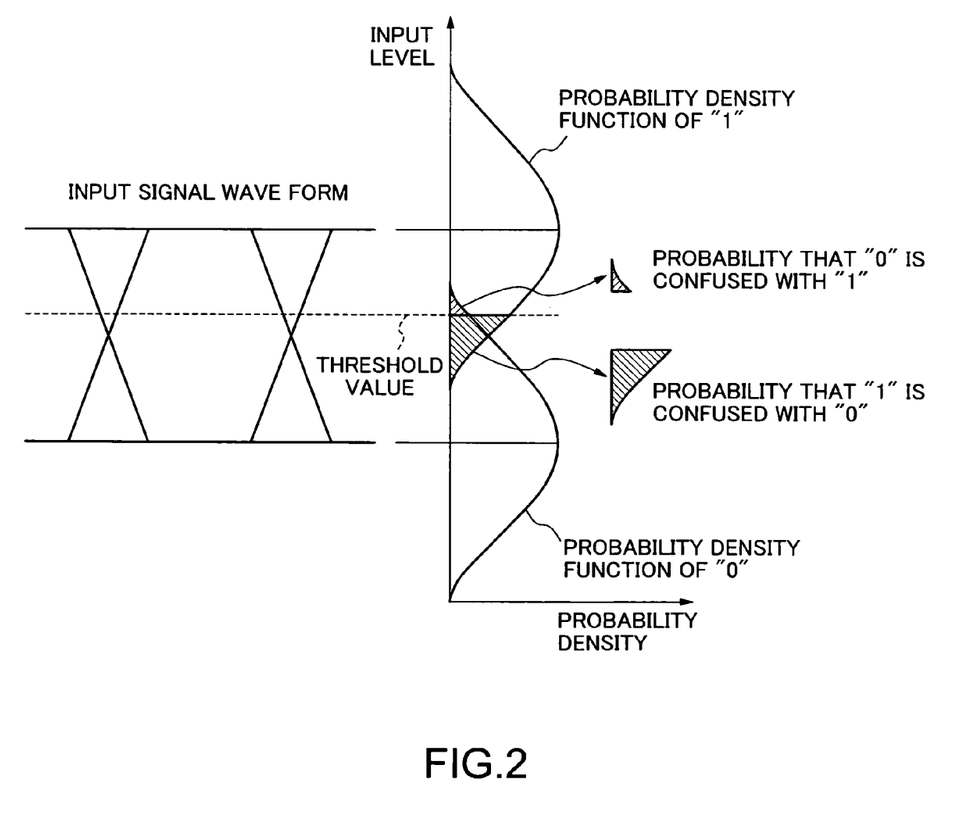
FIG. 2 is an explanatory diagram showing a threshold value adjustment principle in a threshold value adjusting circuit shown in FIG. 1.

FIG. 2 is an explanatory diagram showing a threshold value adjustment principle in the threshold value adjusting circuit 38 composing the error correction information calculating circuit 32. The identification circuit 26 identifies as "1" when a level of the input signal (output signal from the reshaping circuit 22) is larger than the threshold value set by the error correction information calculating circuit 32. On the other hand, the identification circuit 26 identifies as "0" when the level of the input signal is equal to or smaller than the threshold value. Here, assume that probability density functions of "1" and "0" with respect to the input signal inputted to the identification circuit 26 are specified as shown in FIG. 2. In this case, a bit error rate (hereinafter referred to as a BER) is expressed by the sum of an area of a range of the probability density function of "0" whose level is higher than the threshold value and an area of a range of the probability density function of "1" whose level is equal to or smaller than the threshold value. The range of the probability density function of "0" whose level is higher than the threshold value can be assumed to be the probability that "0" is confused with "1". The range of the probability density function of "1" whose level is equal to or smaller than the threshold value can be assumed to be the probability that "1" is confused with "0". When the threshold value is set to a level in which the areas of these ranges become equal to each other, the BER theoretically becomes minimal.

In view of the threshold value adjustment principle, the threshold value adjusting circuit 38 adjusts the threshold value based on the error correction information EB0 and EB1 outputted from the FEC decoder 30. More specifically, when EB0>EB1, the threshold value is increased. When EB0<EB1, the threshold value is reduced. Such processing is repeated, so that EB0 becomes equal to EB1. In other words, the threshold value is shifted to a level in which the probability that "0" is confused with "1" becomes equal to the probability that "1" is confused with "0".

Hereinafter, the operation of the error correction information calculating circuit 32 will be described. The error correction information calculating circuit 32 fundamentally calculates the threshold value based on the error correction information EB0, EB1, and FAIL outputted from the FEC decoder 30 and various abnormality alarms outputted from the abnormality detecting circuit 16 and outputs the calculated threshold value to the identification circuit 26.

The error correction information calculating circuit 32 checks whether or not the abnormality detecting circuit 16 generates an alarm. When no alarm is generated, the threshold value adjusting circuit 38 of the error correction information calculating circuit 32 is driven to repeat a search for an optimum threshold value in which the error correction information EB0 and EB1 become equal to each other. When the alarm is outputted from the abnormality detecting circuit 16 during the search for the optimum threshold value, the threshold value initializing circuit 36 of the error correction information calculating circuit 32 is driven to change the threshold value set in the identification circuit 26 to the initial threshold value stored in the storing circuit 34. When the alarm from the abnormality detecting circuit 16 is reset, the threshold value adjusting circuit 38 of the error correction information calculating circuit 32 is driven to restart the search for the optimum threshold value.

As described above, during the normal operation, the regenerating apparatus 10 according to this embodiment sets the threshold value such that the error correction information EB0 becomes equal to the error correction information EB1. Therefore, the regenerating apparatus 10 can obtain a high-quality digital signal having less error data during the normal operation. On the other hand, when an abnormality occurs, the regenerating apparatus 10 stops the search for the optimum threshold value and sets the threshold value to the initial threshold value. Therefore, the regenerating apparatus 10 can stably obtain a digital signal having predetermined quality without an extreme deterioration in quality even when an abnormality occurs.

Figure 3:
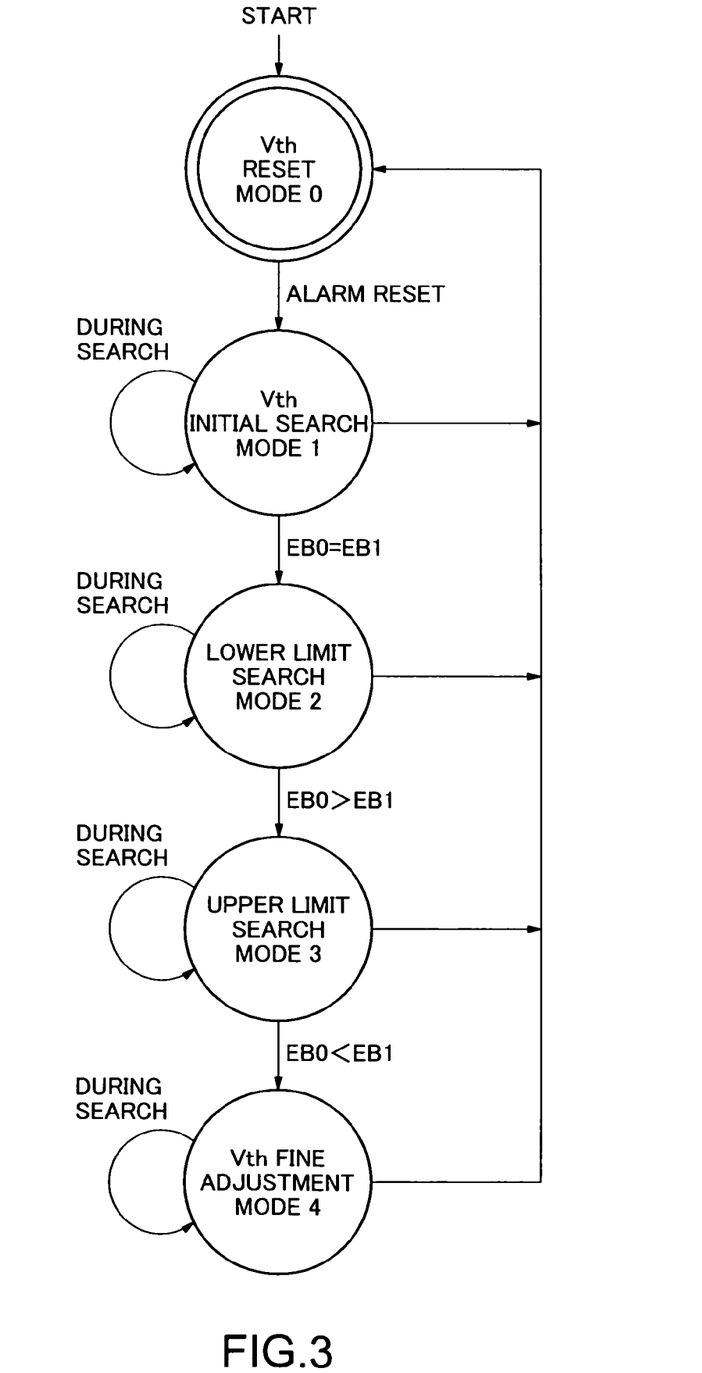
FIG. 3 is a state diagram explaining another threshold value adjustment operation in an error correction information calculating circuit shown in FIG. 1.
Figure 4:
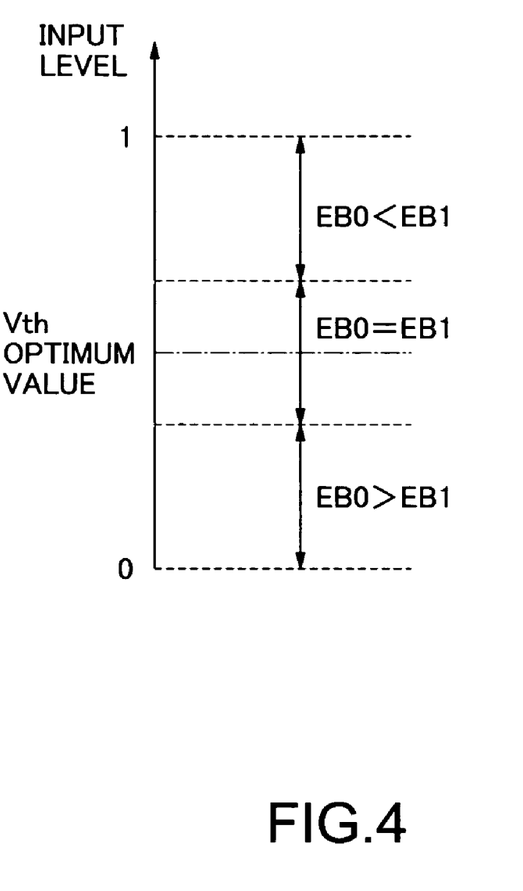
FIG. 4 is an explanatory diagram showing an optimum threshold value setting method executed during the threshold value adjustment operation shown in FIG. 3.

FIG. 3 is a state diagram explaining another threshold value adjustment operation (application example) of the error correction information calculating circuit 32. As shown in FIG. 4, a feature of this operation is that the threshold value outputted to the identification circuit 26 is set to a central value within a threshold value range in which the error correction information EB0 and EB1 become equal to each other.

When the alarm is outputted from the abnormality detecting circuit 16, the threshold value initializing circuit 36 of the error correction information calculating circuit 32 is driven to set a threshold value Vth for the identification circuit 26 to the initial threshold value (mode0).

When the alarm from the abnormality detecting circuit 16 is reset, the threshold value adjusting circuit 38 of the error correction information calculating circuit 32 is driven. The threshold value adjusting circuit 38 changes the threshold value Vth based on the magnitude relation of the error correction information EB0 and EB1 until the threshold value Vth in which the error correction information EB0 and EB1 become equal to each other is detected (mode1: initial search mode).

When the threshold value Vth in which the error correction information EB0 and EB1 become equal to each other is detected, the threshold value adjusting circuit 38 gradually reduces the threshold value Vth until a lower limit value of the threshold value Vth in which the error correction information EB0 and EB1 become equal to each other is detected (mode2: lower limit search mode).

When the lower limit value of the threshold value Vth in which the error correction information EB0 and EB1 become equal to each other is detected, the threshold value adjusting circuit 38 gradually increases the threshold value Vth until an upper limit value of the threshold value Vth in which the error correction information EB0 and EB1 become equal to each other is detected (mode3: upper limit search mode).

When the upper limit value of the threshold value Vth in which the error correction information EB0 and EB1 become equal to each other is detected, the threshold value adjusting circuit 38 sets as the optimum threshold value Vth a central value between the upper limit value and the lower limit value of the threshold value Vth in which the error correction information EB0 and EB1 become equal to each other.

Next, the threshold value adjusting circuit 38 monitors the error correction information EB0 and EB1 and changes the threshold value Vth based on the error correction information EB0 and EB1 only when the error correction information EB0 and EB1 are different from each other (mode4: Vth fine adjustment mode).

While the threshold value adjusting circuit 38 performs the search for the optimum threshold value, the error correction information calculating circuit 32 monitors whether or not the abnormality detecting circuit 16 generates an alarm. When the alarm is detected, the operation of the error correction information calculating circuit 32 returns to mode0. Then, the threshold value initializing circuit 36 is driven to set the threshold value Vth for the identification circuit 26 to the initial threshold value. When the number of frame out-of-synchronization and the number of bits which cannot be subjected to error correction by the FEC decoder 30 (error correction information FAIL) each are equal to or larger than a predetermined value, the error correction information calculating circuit 32 maintains a running mode without the state transition.

According to the above-mentioned application example, a large margin can be set for a variation in threshold value Vth, so it is possible to stably obtain a high-quality digital signal. Note that the operation order of mode2 and mode3 is not limited to the above-mentioned order. The operation mode2 may be executed after the operation mode3.

In this embodiment, the abnormality detecting circuit 16 includes the frame synchronization circuit 40, the input signal cutoff detecting circuit 42, and the failure detecting circuit 44. However, the present invention is not necessarily limited to such an abnormality detecting circuit. That is, the abnormality detecting circuit 16 does not necessarily include all the above-mentioned detecting circuits. A novel detecting circuit different from the above-mentioned detecting circuits may be added to the abnormality detecting circuit 16.

In this embodiment, the FEC system is described as a system for performing error correction on a digital signal. However, the present invention is not necessarily limited to this system and thus other error correction systems can be employed.

Each of the circuits shown in FIG. 1, such as the identification circuit 26 and the threshold value adjusting circuit 38 is not necessarily limited to a circuit having a hardware structure, such as a large scale integration (LSI) circuit or an integrated circuit (IC). For example, each of the circuits may be based on a software structure in which predetermined programs are executed by a central processing unit (CPU).

While this invention has been described in connection with certain exemplary embodiments, it is to be understood that the subject matter encompassed by way of this invention is not to be limited to those specific embodiments. On the contrary, it is intended for the subject matter of the invention to include all alternatives, modifications, and equivalents as can be included within the spirit and scope of the following claims.

Further, it is the inventor's intent to retain all equivalents of the claimed invention even if the claims are amended during prosecution.

What is claimed is:

1. A regenerating apparatus, comprising:
    an identification circuit which regenerates a digital signal from an input signal by determining whether or not a level of the input signal exceeds a threshold value;
    an error correcting circuit which corrects an error of the regenerated digital signal;
    an abnormality detecting circuit which monitors an operation state of the regenerating apparatus and generates an alarm when a predetermined abnormal operation is detected;
    a threshold value adjusting circuit which adjusts the threshold value to make a first error correction number indicating the number of error bits corrected from 0 to 1 equal to a second error correction number indicating the number of error bits corrected from 1 to 0 when the alarm is not generated; and a threshold value initializing circuit which sets the threshold value to an initial threshold value when the alarm is generated.

2. A regenerating apparatus according to claim 1, wherein the threshold value adjusting circuit changes the threshold value to make the first error correction number equal to the second error correction number when the first error correction number becomes different from the second error correction number, generates an upper limit value and a lower limit value of a threshold value range in which the first error correction number becomes equal to the second error correction number, and sets a central value between the upper limit value and the lower limit value as an optimum threshold value to the identification circuit.

3. A regenerating apparatus according to claim 2, wherein the threshold value adjusting circuit reduces the threshold value to obtain the lower limit value of the threshold value range while the first error correction number is equal to the second error correction number and increases the threshold value to obtain the upper limit value of the threshold value range while the first error correction number is equal to the second error correction number.

4. A regenerating apparatus according to claim 1, wherein the abnormality detecting circuit can detect frame out-of-synchronization, a failure of a receiver including the regenerating apparatus, and an input signal cutoff.

5. A regenerating apparatus according to claim 4, wherein the threshold value initializing circuit sets the threshold value to the initial threshold value upon receiving at least one of an alarm indicating the frame out-of-synchronization, an alarm indicating the failure of the receiver including the regenerating apparatus, and an alarm indicating the input signal cutoff from the abnormality detecting circuit.

6. A regenerating apparatus according to claim 1, wherein the error correcting circuit comprises a circuit operated based on a forward error correction system.

7. A regenerating method for an apparatus that executes an operation for regenerating a digital signal from an input signal by determining whether or not a level of the input signal exceeds a threshold value and correcting an error of the regenerated digital signal, comprising:
adjusting the threshold value to make a first error correction number indicating the number of error bits corrected from 0 to 1 equal to a second error correction number indicating the number of error bits corrected from 1 to 0 while the apparatus normally operates; and
setting the threshold value to an initial threshold value when the apparatus has an abnormality.

8. A regenerating method according to claim 7, the threshold value adjusting further comprising:
changing the threshold value to make the first error correction number equal to the second error correction number when the first error correction number becomes different from the second error correction number;
generating an upper limit value and a lower limit value of a threshold value range in which the first error correction number becomes equal to the second error correction number; and
setting a central value between the upper limit value and the lower limit value as an optimum threshold value.

9. A regenerating method according to claim 8, the threshold value adjusting further comprising:
reducing the threshold value to obtain the lower limit value of the threshold value range while the first error correction number is equal to the second error correction number; and
increasing the threshold value to obtain the upper limit value of the threshold value range while the first error correction number is equal to the second error correction number.

10. A regenerating method according to claim 7, wherein an abnormality of the apparatus comprises at least one of frame out-of-synchronization, a failure of a receiver including the regenerating apparatus, and an input signal cutoff.

11. A receiver, comprising:
an identification circuit which regenerates a digital signal from an input signal by determining whether or not a level of the input signal exceeds a threshold value;
an error correcting circuit which corrects an error of the regenerated digital signal;
an abnormality detecting circuit which monitors an operation state of the receiver and generates an alarm when a predetermined abnormal operation is detected;
a threshold value adjusting circuit which adjusts the threshold value to make a first error correction number indicating the number of error bits corrected from 0 to 1 equal to a second error correction number indicating the number of error bits corrected from 1 to 0 when the alarm is not generated; and
a threshold value initializing circuit which sets the threshold value to an initial threshold value when the alarm is generated.

12. A receiver according to claim 11, wherein the threshold value adjusting circuit changes the threshold value to make the first error correction number equal to the second error correction number when the first error correction number becomes different from the second error correction number, generates an upper limit value and a lower limit value of a threshold value range in which the first error correction number becomes equal to the second error correction number, and sets a central value between the upper limit value and the lower limit value as an optimum threshold value to the identification circuit.

13. A receiver according to claim 12, wherein the threshold value adjusting circuit reduces the threshold value to obtain the lower limit value of the threshold value range while the first error correction number is equal to the second error correction number and increases the threshold value to obtain the upper limit value of the threshold value range while the first error correction number is equal to the second error correction number.

14. A receiver according to claim 11, wherein the abnormality detecting circuit can detect frame out-of-synchronization, a failure of the receiver, and an input signal cutoff.

15. A receiver according to claim 14, wherein the threshold value initializing circuit sets the threshold value to the initial threshold value upon receiving at least one of an alarm indicating the frame out-of-synchronization, an alarm indicating the failure of the receiver, and an alarm indicating the input signal cutoff from the abnormality detecting circuit.

16. A receiver according to claim 11, wherein the error correcting circuit comprises a circuit operated based on a forward error correction system.

17. A regenerating apparatus, comprising:
identification means for regenerating a digital signal from an input signal by determining whether or not a level of the input signal exceeds a threshold value;
error correcting means for correcting an error of the regenerated digital signal;
abnormality detecting means for monitoring an operation state of the regenerating apparatus and generating an alarm when a predetermined abnormal operation is detected;

threshold value adjusting means for adjusting the threshold value to make a first error correction number indicating the number of error bits corrected from 0 to 1 equal to a second error correction number indicating the number of error bits corrected from 1 to 0 when the alarm is not generated; and threshold value initializing means for setting the threshold value to an initial threshold value when the alarm is generated.

18. A regenerating apparatus according to claim 17, wherein the threshold value adjusting means changes the threshold value to make the first error correction number equal to the second error correction number when the first error correction number becomes different from the second error correction number, generates an upper limit value and a lower limit value of a threshold value range in which the first error correction number becomes equal to the second error correction number, and sets a central value between the upper limit value and the lower limit value as an optimum threshold value to the identification circuit.

* * * * *